US009575916B2

(12) United States Patent
Caufield et al.

(10) Patent No.: US 9,575,916 B2
(45) Date of Patent: Feb. 21, 2017

(54) APPARATUS AND METHOD FOR IDENTIFYING PERFORMANCE BOTTLENECKS IN PIPELINE PARALLEL PROCESSING ENVIRONMENT

(71) Applicant: International Business Machines Corporation, Armonk, NY (US)

(72) Inventors: Brian K. Caufield, Livermore, CA (US); Ron E. Liu, San Jose, CA (US); DongJie Wei, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 14/148,697

(22) Filed: Jan. 6, 2014

(65) Prior Publication Data

US 2015/0193368 A1    Jul. 9, 2015

(51) Int. Cl.
*G06F 7/00* (2006.01)
*G06F 13/36* (2006.01)

(52) U.S. Cl.
CPC .................... *G06F 13/36* (2013.01)

(58) Field of Classification Search
CPC ...................................... G06F 12/00
See application file for complete search history.

(56) References Cited

U.S. PATENT DOCUMENTS

| 4,850,027 A | 7/1989 | Kimmel |
| 4,974,223 A | 11/1990 | Ancheta |
| 5,197,127 A | 3/1993 | Waclawsky et al. |
| 5,473,773 A | 12/1995 | Aman et al. |
| 5,517,323 A | 5/1996 | Propach |

(Continued)

FOREIGN PATENT DOCUMENTS

| EP | 0210434 B1 | 9/1993 |
| EP | 0419805 B1 | 11/1995 |

(Continued)

OTHER PUBLICATIONS

"Hadoop Performance Monitoring", hadoop-toolkit wiki, update Jun. 14, 2010 by impetus.opensource. https://code.google.com/p/hadoop-toolkit/wiki/HadoopPerformanceMonitoring.

(Continued)

*Primary Examiner* — Cheng-Yuan Tseng
(74) *Attorney, Agent, or Firm* — Laura E. Gisler

(57) ABSTRACT

A system identifies a performance bottleneck status in a parallel data processing environment by examining data flow associated with the parallel data processing environment to identify at least one operator, where an operator type is associated with at least one operator, at least one buffer, and a relationship that the buffer has with the operator, where the relationship is associated with the operator type. The system monitors the buffer to determine a buffer status associated with the buffer. The system applies a set of rules to identify an operator bottleneck status associated with the operator. The set of rules is applied to the operator, based on the operator type, the buffer status, and relationship that the buffer has with the operator. The system then determines a performance bottleneck status associated with the parallel data processing environment, based on the operator bottleneck status.

17 Claims, 4 Drawing Sheets

(56) References Cited

U.S. PATENT DOCUMENTS

| | | |
|---|---|---|
| 5,539,531 A | 7/1996 | Propach |
| 5,566,000 A | 10/1996 | Propach |
| 5,937,202 A | 8/1999 | Crosetto |
| 6,311,265 B1 | 10/2001 | Beckerle et al. |
| 6,330,008 B1 | 12/2001 | Razdow et al. |
| 6,434,613 B1 | 8/2002 | Bertram et al. |
| 6,457,143 B1 | 9/2002 | Yue |
| 6,470,464 B2 | 10/2002 | Bertram et al. |
| 6,557,035 B1 | 4/2003 | McKnight |
| 6,721,826 B2 | 4/2004 | Hoglund |
| 6,801,938 B1 | 10/2004 | Bookman et al. |
| 6,970,805 B1 | 11/2005 | Bierma et al. |
| 7,203,746 B1 | 4/2007 | Harrop |
| 7,299,216 B1 | 11/2007 | Liang et al. |
| 7,673,291 B2 | 3/2010 | Dias et al. |
| 7,689,690 B2 | 3/2010 | Loboz et al. |
| 7,748,001 B2 | 6/2010 | Burns |
| 8,041,834 B2 | 10/2011 | Ferri et al. |
| 8,055,367 B2 | 11/2011 | Kneisel |
| 8,122,050 B2 | 2/2012 | Mordvinov et al. |
| 8,126,315 B2 | 2/2012 | Kim et al. |
| 8,225,291 B2 | 7/2012 | Chung et al. |
| 8,234,635 B2 | 7/2012 | Isshiki |
| 8,370,823 B2 | 2/2013 | Bashkansky et al. |
| 8,738,972 B1 | 5/2014 | Bakman et al. |
| 2003/0014507 A1 | 1/2003 | Bertram et al. |
| 2003/0061324 A1 | 3/2003 | Atherton et al. |
| 2003/0061413 A1 | 3/2003 | Hoglund |
| 2003/0120778 A1 | 6/2003 | Chaboud et al. |
| 2004/0015381 A1 | 1/2004 | Johnson et al. |
| 2004/0059701 A1 | 3/2004 | Fedorov |
| 2004/0221038 A1 | 11/2004 | Clarke et al. |
| 2005/0050404 A1 | 3/2005 | Castelli et al. |
| 2005/0071842 A1 | 3/2005 | Shastry |
| 2005/0187991 A1 | 8/2005 | Wilms et al. |
| 2005/0222819 A1 | 10/2005 | Boss et al. |
| 2005/0268299 A1 | 12/2005 | Picinich et al. |
| 2006/0153090 A1 | 7/2006 | Bishop et al. |
| 2006/0218450 A1 | 9/2006 | Malik |
| 2007/0118401 A1 | 5/2007 | Mahesh et al. |
| 2008/0091720 A1 | 4/2008 | Klumpp et al. |
| 2008/0127149 A1 | 5/2008 | Kosche et al. |
| 2008/0222634 A1 | 9/2008 | Rustagi |
| 2008/0282232 A1 | 11/2008 | Cong et al. |
| 2009/0066712 A1 | 3/2009 | Gilger |
| 2009/0077005 A1 | 3/2009 | Yung et al. |
| 2009/0307597 A1 | 12/2009 | Bakman |
| 2010/0036810 A1 | 2/2010 | Wu et al. |
| 2010/0125565 A1 | 5/2010 | Burger et al. |
| 2010/0250748 A1 | 9/2010 | Sivasubramanian et al. |
| 2010/0312776 A1 | 12/2010 | Burrichter et al. |
| 2011/0061057 A1 | 3/2011 | Harris et al. |
| 2011/0099559 A1 | 4/2011 | Kache et al. |
| 2011/0179371 A1 | 7/2011 | Kopycinski et al. |
| 2011/0225017 A1 | 9/2011 | Radhakrishnan |
| 2011/0229071 A1 | 9/2011 | Vincelette et al. |
| 2011/0314233 A1* | 12/2011 | Yan .................. G06F 17/30501 711/154 |
| 2012/0044814 A1 | 2/2012 | Natarajan |
| 2012/0054147 A1 | 3/2012 | Goetz et al. |
| 2012/0102007 A1 | 4/2012 | Ramasubramanian et al. |
| 2012/0154405 A1 | 6/2012 | Baumgartner et al. |
| 2012/0278594 A1 | 11/2012 | Kumar |
| 2012/0327794 A1 | 12/2012 | Han et al. |
| 2013/0024179 A1 | 1/2013 | Mazzaro et al. |
| 2013/0176871 A1 | 7/2013 | Bertze et al. |
| 2013/0185702 A1 | 7/2013 | Choi et al. |
| 2013/0227573 A1 | 8/2013 | Morsi et al. |
| 2014/0026150 A1 | 1/2014 | Kline et al. |
| 2014/0278337 A1 | 9/2014 | Branson et al. |
| 2014/0280895 A1 | 9/2014 | Branson et al. |
| 2015/0058865 A1 | 2/2015 | Slinger et al. |
| 2015/0268990 A1 | 9/2015 | Greene et al. |
| 2015/0269006 A1 | 9/2015 | Caufield et al. |

FOREIGN PATENT DOCUMENTS

| | | |
|---|---|---|
| EP | 1296220 A2 | 3/2003 |
| EP | 0963102 B1 | 1/2006 |
| JP | 2010115442 A | 5/2010 |
| JP | 4790793 B2 | 10/2011 |
| WO | 2006102442 A2 | 9/2006 |
| WO | 2014143247 A1 | 9/2014 |

OTHER PUBLICATIONS

Informatica, "Proactive Monitoring Option: Identify Data Integration Risks Early and Improve Governance with Proactive Monitoring", (Enterprise Data Integration: Power Center: Options), © 2013 Informatica Corporation. http://www.informatica.com/us/products/enterprise-data-integration/powercenter/options/proactive-monitoring-option/.

Oracle, "3: Monitoring the ETL Process", Oracle® Argus Mart Administrator's Guide, Release 1.0, Apr. 2013, Copyright © 2011, 2013 Oracle. http://docs.oracle.com/cd/E40596_01/doc.10/e38589/monitoringetl.htm#BGBHCCBH.

Battre et al., "Detecting Bottlenecks in Parallel DAG-based Data Flow Programs," 2010 IEEE Workshop on Many-Task Computing on Grids and Supercomputers, Nov. 15, 2010, pp. 1-10 DOI: 10.1109/MTAGS.2010.5699429.

Ravali et al., "Implementing Bottleneck Detection Algorithm in IaaS Cloud for Parallel Data Processing Using," International Journal of Computer Science and Management Research, Aug. 2013, vol. 2, Issue 8 ISSN 2278-733X.

Warneke, D., "Massively Parallel Data Processing on Infrastructure as a Service Platforms," Sep. 28, 2011.

Iqbal et al., "SLA-Driven Automatic Bottleneck Detection and Resolution for Read Intensive Multi-tier Applications Hosted on a Cloud," Advances in Grid and Pervasive Computing, Lecture Notes in Computer Science vol. 6104, pp. 37-46, 2010, Copyright Springer-Verlag Berlin Heidelberg 2010.

Mell et al., "The NIST Definition of Cloud Computing," National Institute of Standards and Technology, U.S. Department of Commerce, Special Publication 800-145, Sep. 2011.

Greene et al., "Performance Management for Data Integration ," U.S. Appl. No. 14/217,567, filed Mar. 18, 2014.

Caufield et al., "Bottleneck Detection for Performance Management," U.S. Appl. No. 14/671,102, filed Mar. 27, 2015.

Longcore, Jeff, Bottleneck identification in cycle time reduction and throughput improvement efforts in an automotive transmission plant, IP.com Prior Art Database Technical Disclosure, Dec. 31, 1999, IPCOM000128111D.

IBM, General Purpose Bottleneck Analysis for Distributed Data Movement Applications, IP.com Prior Art Database Technical Disclosure, Aug. 4, 2006, IPCOM000138798D.

* cited by examiner

APPARATUS AND METHOD FOR IDENTIFYING PERFORMANCE BOTTLENECKS IN PIPELINE PARALLEL PROCESSING ENVIRONMENT

BACKGROUND

Parallel data processing engines are powerful and efficient means of processing large volumes of data, for example, in data integration and data warehousing scenarios. The data processing applications executed by these engines are typically made up of a complex system of processes and/or threads, which are referred to as "operators", working in parallel to perform all of the required data manipulations. Data is passed from one operator to another via record buffers. Each operator gets the data to be processed from its input buffer, and writes the data it has processed to its output buffer. These buffers are shared with the previous and subsequent operators as their output and input buffers, respectively. The overall throughput of the application is generally determined by the slowest operator in the set, as its rate of consumption and production have a ripple effect throughout the application. A slow operator can create a bottleneck in the process. The entire flow of the process may be affected by a bottleneck, but it is difficult to determine where the bottleneck occurs. It is also difficult to determine if multiple bottlenecks occur, and where they may occur.

SUMMARY

According to one embodiment of the present invention, in a method for identifying performance bottleneck status in a parallel data processing environment, implemented by a computing processor, the processor examines data flow associated with the parallel data processing environment to identify at least one operator where an operator type is associated with the operator, at least one buffer, and a relationship that the buffer has with the operator where the relationship is associated with the operator type. The processor monitors the buffer to determine a buffer status associated with the buffer. The processor applies a set of rules to identify an operator bottleneck status associated with the operator where the set of rules is applied to the operator, based on the operator type, the buffer status, and the relationship that the buffer has with the operator. The processor determines a performance bottleneck status associated with the parallel data processing environment, based on the operator bottleneck status.

In one aspect of embodiments disclosed herein, when the method examines data flow associated with the parallel data processing environment, the method identifies a first sub-operator connected to a second sub-operator, where no buffer exists between the first sub-operator and the second sub-operator, and combines the first sub-operator and the second sub-operator to create the operator.

In one aspect of embodiments disclosed herein, when the method examines data flow associated with the parallel data processing environment, the method determines the operator type associated with the operator based on a data partition configuration associated with the buffer, and the relationship that the buffer has with the operator.

In one aspect of embodiments disclosed herein, when the method monitors the buffer to determine the buffer status associated with the buffer, the method determines the buffer status based on a flow of data from the operator to at least one other operator.

In one aspect of embodiments disclosed herein, when the method determines the buffer status based on the flow of data, the method identifies the buffer status as at least one of a buffer FULL status where no data can be written to the buffer, a buffer EMPTY status where no data can be read from the buffer, and a buffer UNKNOWN status where the buffer status is neither the buffer FULL status nor the buffer EMPTY status.

In one aspect of embodiments disclosed herein, when the method applies the set of rules, the method traverses the data flow associated with the parallel data processing environment to apply the rules to each operator in the data flow.

In one aspect of embodiments disclosed herein, when the method determines the performance bottleneck status associated with the parallel data processing environment, the method renders a visualization of the data flow associated with the parallel data processing environment with respect to the operator bottleneck status associated with the operator. The method identifies that the operator is causing a bottleneck in the parallel data processing environment.

In one aspect of embodiments disclosed herein, when the method determines the performance bottleneck status associated with the parallel data processing environment, the method periodically monitors the buffer, and applies the set of rules over a period of time to monitor performance of the parallel data processing environment. The method plots the performance bottleneck status over the period of time to monitor the performance bottleneck status over the period of time.

In one aspect of embodiments disclosed herein, the method plots the performance bottleneck status with respect to the operator bottleneck status to monitor progress of the operator bottleneck status over the period of time.

System and computer program products corresponding to the above-summarized methods are also described and claimed herein.

DETAILED DESCRIPTION

Figure 1:
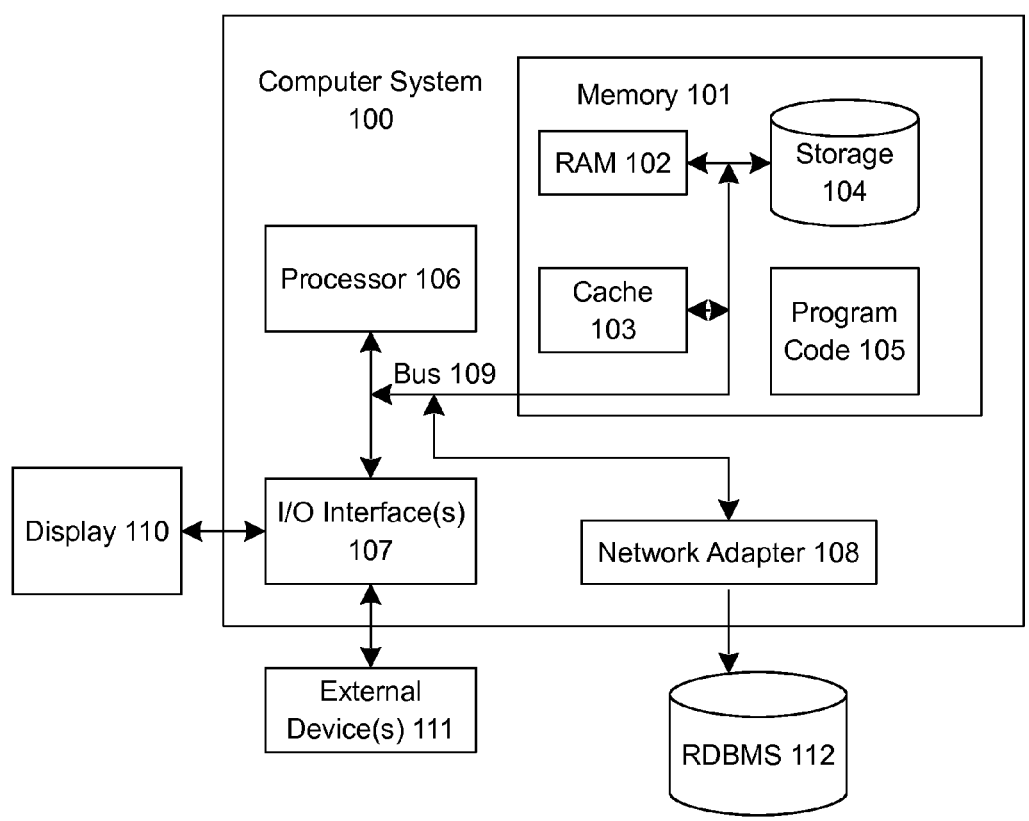
FIG. 1 illustrates an embodiment of a system for identifying performance bottleneck status in a parallel data processing environment, according to embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates a system for identifying performance bottleneck status in a parallel data processing environment, according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more databases 112 via network adapter 108.

Figure 2:
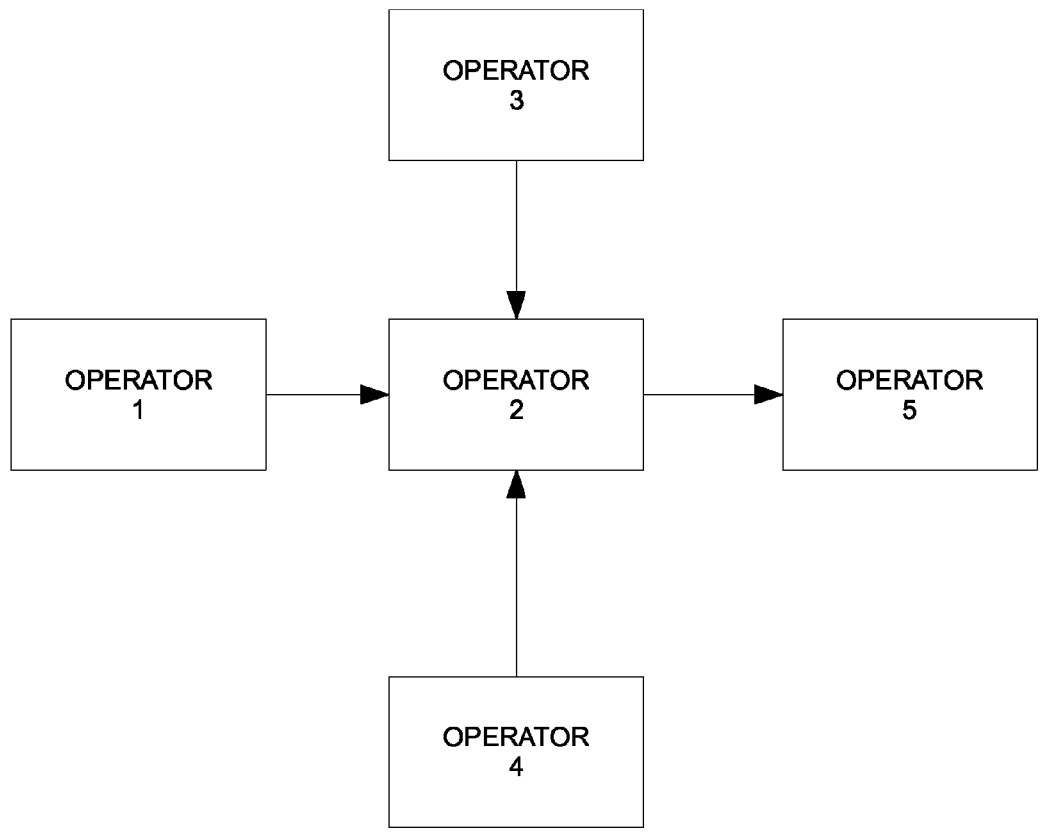
FIG. 2 illustrates an example embodiment of a system in a parallel data processing environment comprising operators.

FIG. 2 illustrates an example parallel data processing environment with multiple operators and operator types. In this example embodiment, Operators 1, 3 and 4 each has the same operator type, that is, each has only one output, and no inputs. Operator 2 has an operator type comprising three inputs and one output (i.e., multiple inputs and one output). Operator 5 has an operator type comprising one input and no outputs. Other example embodiments (not shown) include operator types with only multiple outputs and no inputs, operator types with only one input and one output, operator types with one input and multiple outputs, operator types with multiple inputs and multiple outputs, and operator types with only multiple inputs (i.e., no outputs).

Figure 3:
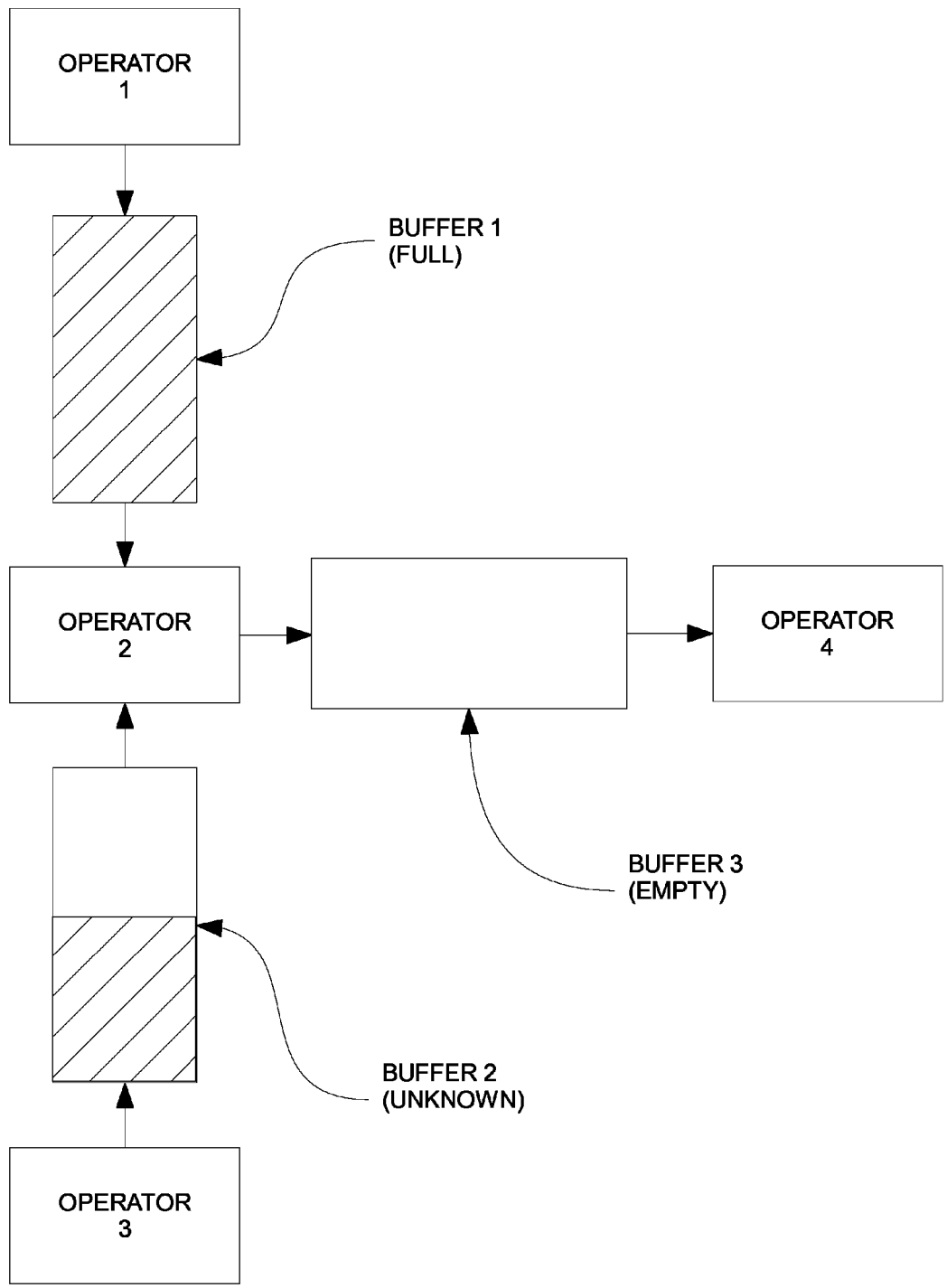
FIG. 3 illustrates an example embodiment of a system in a parallel data processing environment comprising operators and buffers.

FIG. 3 illustrates an example parallel data processing environment with multiple operators and buffers, where each operator and buffer has a respective relationship with each other. For example, Operator 1 has an output buffer, Buffer 1. Operator 2 has two input buffers that are Buffer 1 and Buffer 2. Operator 3 has an output buffer that is also Buffer 2. Operator 4 has an input buffer, Buffer 3. The buffers are used to transport data between operators. Each of the buffers has a buffer status. In this example embodiment, Buffer 1 has a buffer FULL status, meaning no data can currently be written to Buffer 1. Buffer 2 has a buffer UNKNOWN status, meaning the buffer status of Buffer 2 is unknown. Buffer 3 has a buffer EMPTY status, meaning no data can currently be read from Buffer 3.

Figure 4:
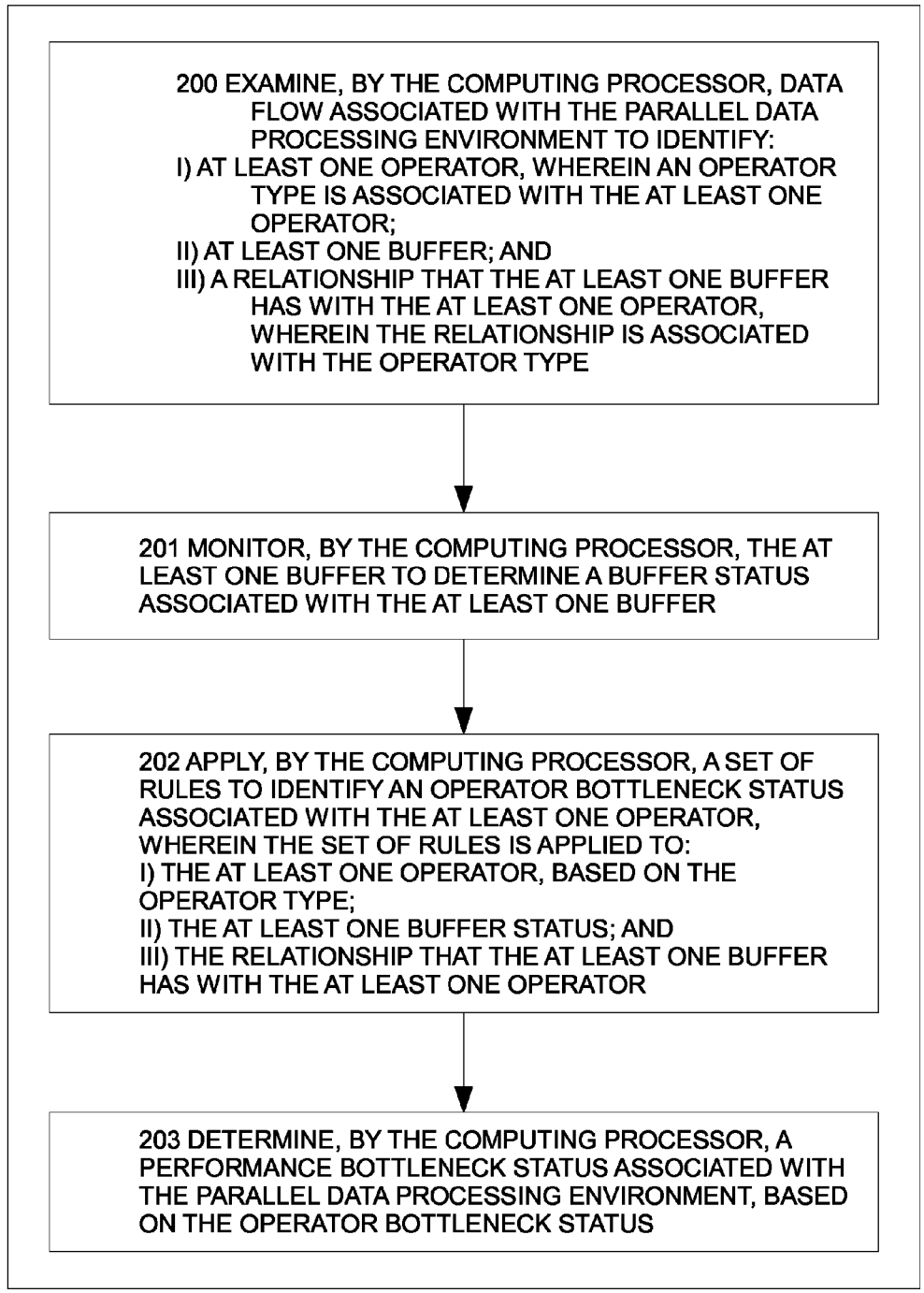
FIG. 4 is a flowchart illustrating an embodiment of a method for identifying performance bottleneck status in a parallel data processing environment, according to embodiments disclosed herein.

FIG. 4 illustrates an embodiment of a method for identifying performance bottleneck status in a parallel data processing environment. At 200, the method, via the processor, examines data flow associated with the parallel data processing environment to identify at least one operator where an operator type is associated with at least one operator, at least one buffer, and a relationship that the buffer has with the operator, where the relationship is associated with the operator type. As noted in FIG. 2, the operator type may include various inputs and outputs.

At 201, the method, via the processor monitors the buffer to determine a buffer status associated with the buffer. The buffer is used to transport data between operators. As noted in FIG. 3, the buffer status may be buffer FULL status, buffer EMPTY status, or buffer UNKNOWN status.

At 202, the method, via the processor, applies a set of rules to identify an operator bottleneck status associated with the operator. The set of rules is applied to the operator (based on the operator type), the buffer status, and the relationship that the buffer has with the operator to determine the operator bottleneck status. The operator bottleneck status may indicate whether the operator is causing a bottleneck, whether the operator is not causing a bottleneck, or whether it is unknown if the operator is causing a bottleneck. Table 1 displays example rules that are applied to the operator, based on the operator type, the buffer status, and the relationship that the buffer has with the operator. For example, the buffer may be an input to the operator (i.e., "Input Link Buffer") or an output to the operator (i.e., "Output Link Buffer"). In an example embodiment, the method applies the rules to the operator, based on the operator type, and the buffer status, taking into account whether the buffer is an Input Link Buffer or an Output Link Buffer.

TABLE 1

| Operator Type | Input Link Buffer Status | Output Link Buffer Status | Is the operator a Bottleneck? |
|---|---|---|---|
| a. Operator has only 1 output link | N/A | FULL | No |
| | | EMPTY | Yes |
| | | UNKNOWN | Unknown |
| b. Operator has only output links (multiple) | N/A | Buffer status for any link is FULL | No |
| | | Buffer status for all links is EMPTY | Yes |
| | | Buffer status for some links are UNKNOWN but no links are FULL | Unknown |
| c. Operator has only 1 input link and 1 output link | FULL | FULL | No |
| | | EMPTY | Yes |
| | | UNKNOWN | Unknown |
| | EMPTY | Any Status | No |
| | UNKNOWN | FULL | No |
| | | EMPTY | Unknown |
| | | UNKNOWN | Unknown |
| d. Operator has multiple input link and 1 Output link | Buffer status for any link is FULL | FULL | No |
| | | EMPTY | YES |
| | | UNKNOWN | Unknown |
| | Buffer status for all links is EMPTY | Any Status | No |
| | Buffer status for some links are UNKNOWN but no links are FULL | FULL | No |
| | | EMPTY | Unknown |
| | | UNKNOWN | Unknown |
| e. Operator has 1 input link and multiple output link | FULL | Buffer status for any link is FULL | No |
| | | Buffer status for all link is EMPTY | Yes |
| | | Buffer status for some links are UNKNOWN but no links are FULL | Unknown |
| | EMPTY | Any Status(for each link) | No |
| | UNKNOWN | Buffer status for any link is FULL | No |
| | | Buffer status for all links is EMPTY | Unknown |

TABLE 1-continued

| Operator Type | Input Link Buffer Status | Output Link Buffer Status | Is the operator a Bottleneck? |
|---|---|---|---|
| | | Buffer status for some links are UNKNOWN but no links are FULL | Unknown |
| f. Operator has multiple input links and Multiple output links | Buffer status for any link is FULL | Buffer status for any link is FULL | No |
| | | Buffer status for all links is EMPTY | Yes |
| | | Buffer status for some links are UNKNOWN but no links are FULL | Unknown |
| | Buffer status for all links is EMPTY | Any Status (for each link) | No |
| | Buffer status for some links are UNKNOWN but no links are FULL | Buffer status for any link is FULL | No |
| | | Buffer status for all links is EMPTY | Unknown |
| | | Buffer status for some links are UNKNOWN but no links are FULL | Unknown |
| g. Operator has only 1 input link | FULL | N/A | Yes |
| | EMPTY | N/A | No |
| | UNKNOWN | N/A | Unknown |
| h. Operator has only input links (multiple) | Buffer status for any link is FULL | N/A | Yes |
| | Buffer status for all links is EMPTY | N/A | No |
| | Buffer status for some links are UNKNOWN but no links are FULL | N/A | Unknown |

For example, in FIG. 3, Operator 2 has two inputs and one output. Buffer 1 is an input link to Operator 2 and has a buffer FULL status. Buffer 2 is also an input link to Operator 2 and has an UNKNOWN status. Buffer 3 is an output link from Operator 2, and has a buffer EMPTY status. By applying the rules illustrated in Table 1, the method determines that Operator 2 has multiple inputs and only one output, and therefore the rules in section (d) apply to Operator 2. Because the buffer of one of the input links (Buffer 1) of Operator 2 is FULL and the buffer of its output link (Buffer 3) is EMPTY, by applying the rules illustrated in Table 1, the method determines that Operator 2 is a bottleneck.

At 203, the method, via the processor, determines a performance bottleneck status associated with the parallel data processing environment, based on the operator bottleneck status. For example, the operator bottleneck status may be "Bottleneck" (i.e., the operator is the bottleneck in the data flow pipeline), "Not bottleneck" or "Unknown".

In an example embodiment, when the method examines data flow associated with the parallel data processing environment, the method may perform some preparation before the method determines the operator bottleneck status. For example, the method identifies a first sub-operator connected to a second sub-operator, yet no buffer exists between the first sub-operator and the second sub-operator. In this scenario, the method treats both operators as a single operator by combining the first sub-operator and the second sub-operator to create the single operator. In yet another example embodiment, if there exists no buffer between Operator A and Operator B, and a buffer exists between Operator B and Operator C, but no buffer exists between Operator C and Operator D, then the method combines Operator A and Operator B to create Operator A-B. The method also combines Operator C and Operator D to create Operator C-D, and applies the set of rules to Operator A-B, Operator C-D, and the buffer that exists between these two operators. In other words, the method applies the set of rules based the respective type of operators (i.e., Operator A-B, and Operator C-D), the interaction between Operator A-B and the buffer, the interaction between Operator C-D and the buffer, and the status of the buffer to determine the operator bottleneck status of each of Operator A-B and Operator C-D.

In an example embodiment, when the method examines data flow associated with the parallel data processing environment, the method determines the operator type associated with the operator based on a data partition configuration that is associated with the buffer, and the relationship that the buffer has with the operator. In serial processing mode, a first operator writes data to a buffer where the next operator (i.e., downstream from the first operator) reads the data. In parallel processing mode, the data may be passed from one operator (i.e., an upstream operator) to another operator (i.e., a downstream operator) in a number of different ways. The data may be partitioned and processed by multiple instances of operators in different nodes, for example, logical or physical. For example, a first operator may partition the data in N number of ways, while a downstream operator may be partitioned to receive the data in M number of ways.

There are many ways in which data may be partitioned. For example, data may be received from a downstream operator in the same way it was partitioned from the upstream operator. An upstream operator may run in serial mode, and split the data into partitions for a downstream operator that is running in parallel mode. The data may be partitioned at the upstream operator and re-partitioned to a downstream operator (i.e., the upstream operator, running in parallel processing mode, is partitioned into N number of ways while the downstream operator, also running in parallel processing mode, is partitioned in M number of ways). The data may be partitioned at the upstream operator, running in parallel mode, collected into one partition for the downstream operator that is running in serial mode.

In an example embodiment, when the method monitors the buffer to determine the buffer status associated with the buffer, the method determines the buffer status based on a flow of data from at least one operator (i.e., the upstream operator) to another operator or operators (i.e., the downstream operator(s)). An operator may have an input buffer(s) and/or an output buffer(s). If an operator is slower than its upstream operator, the upstream operator will write the data at a rate faster than the downstream operator can consume. Eventually, the buffer (i.e., the output buffer of the upstream operator is also the input buffer of the downstream operator) will be filled up. However, the status of the buffer (i.e., "FULL") does not indicate whether the bottleneck is a result of the downstream operator not processing the data quickly enough. The bottleneck may be a result of another operator further downstream from the downstream operator. Thus, the method monitors the buffer status of both the input buffer and the output buffer of an operator. For example, if the downstream operator has a full input buffer and an empty output buffer, then that downstream operator is the bottleneck. However, if the downstream operator has both a full input buffer and full output buffer, then that downstream operator is not the bottleneck (most likely another operator further downstream is the bottleneck).

In an example embodiment, when the method determines the buffer status based on the flow of data, the method identifies the buffer status. The buffer status may be a buffer FULL status where no data can be written to the buffer. For example, if the upstream operator processes data faster than the downstream operator can consume the data, eventually, the upstream operator will not be able to write data to the buffer until the downstream operator consumes some of the data in the buffer. The buffer status may be a buffer EMPTY status where no data can be read from the buffer. For example, if the downstream operator is consuming the data (provided by the upstream operator) faster than the upstream operator is writing the data, eventually the downstream operator will need to wait for the upstream operator to write more data before the downstream operator can proceed to consume the data. The buffer status may be a buffer UNKNOWN status where the buffer status is neither the buffer FULL status nor the buffer EMPTY status. For example, the buffer UNKNOWN status may be a temporary status before the upstream operator writes data to the buffer, or the downstream operator consumes the data. Or, the buffer UNKNOWN status may be a result of the upstream operator writing data at the same rate that the downstream operator consumes the data.

In an example embodiment, when the method applies the set of rules, the method traverses the data flow associated with the parallel data processing environment to apply the rules to each operator in the data flow. FIG. 2 and FIG. 3 illustrate example parallel data processing environments, with multiple operators and buffers. Other example parallel data processing environments may have many more (or fewer) operators and buffers. The method traverses the data flow associated with the data processing environment, and applies the set of rules to each operator. Table 1 depicts an example set of rules. The method performs the traversal to identify whether a bottleneck exists within the data processing environment, and which operator(s) may be responsible for bottleneck(s).

In an example embodiment, when the method determines the performance bottleneck status associated with the parallel data processing environment, the method renders a visualization of the data flow associated with the parallel data processing environment with respect to the operator bottleneck status associated with operator(s). The visualization provides information as to which operator(s) may (or may not) be causing a bottleneck within the parallel processing environment. In an example embodiment, the visualization may be plotted as a chart, or report interactively where the bottleneck(s) are, and how they shift over time during the execution of the parallel data processing environment.

In an example embodiment, snapshots of the visualization may be taken periodically to determine and track which operator(s) are causing bottlenecks at any given period of time. The method determines snapshot data of the status of the buffer(s). The method has knowledge of which operator(s) are in the parallel processing data environment, and the respective associated operator types. The method applies rules to determine if any operator(s) are a bottleneck for that snapshot. The method then continues to track the operator bottleneck status of multiple operators over a plurality of snapshots to plot data flows through the parallel processing data environment. These snapshots may be used to plot a chart depicting the operator bottleneck status of operator(s) over time. The snapshot visualizations may also be used as "live" monitoring of the parallel data processing environment to visualize any current bottlenecks as they are progressing (i.e., bottlenecks occurring, continuing to occur, bottlenecks being resolved, etc.) and or shifting (i.e., a bottleneck at an upstream operator now becomes a bottleneck at a downstream operator).

In an example embodiment, the method may identify that at least one operator is causing a bottleneck in the parallel data processing environment. The method may identify this operator based on the visualization.

In an example embodiment, when the method determines the performance bottleneck status associated with the parallel data processing environment, the method periodically monitors the buffer(s) and applies the set of rules over a period of time to monitor performance of the parallel data processing environment. The method monitors and tracks the performance of the parallel data processing environment, over a period of time, to determine the performance bottleneck status of the entire parallel data processing environment. The method also provides information as to which operators are causing bottlenecks within the parallel data processing environment.

In an example embodiment, the method plots the performance bottleneck status over the period of time to monitor the performance bottleneck status over the period of time. The performance bottleneck status is the overall status of the parallel data processing environment. Thus, the method tracks whether there exists any bottlenecks within the parallel data processing environment. For example, at Time=2, there may be no bottlenecks, at Time=3, there may be one bottleneck, and at Time=4, there may be two bottlenecks at two different operators.

In an example embodiment, the method plots the performance bottleneck status with respect to the operator bottleneck status over the period of time to monitor the progress of the operator bottleneck status over the period of time. The operator bottleneck status is the status of a bottleneck that is associated with an operator. In an example embodiment, the method tracks an individual bottleneck as it appears, as it potentially travels to another operator, or as it disappears.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying performance bottleneck status in a parallel data processing environment, implemented by a computing processor, the method comprising:
   examining, by the computing processor, data flow associated with the parallel data processing environment to identify:
   i) at least one operator, wherein an operator type is associated with the at least one operator;
   ii) at least one buffer; and
   iii) a relationship that the at least one buffer has with the at least one operator, wherein the relationship is associated with the operator type; and wherein examining the data flow associated with the parallel data processing environment comprises:
identifying a first sub-operator connected to a second sub-operator, wherein no buffer exists between the first sub-operator and the second sub-operator; and
combining the first sub-operator and the second sub-operator to create the at least one operator;
monitoring, by the computing processor, the at least one buffer to determine a buffer status associated with the at least one buffer;
applying, by the computing processor, a set of rules to identify an operator bottleneck status associated with the at least one operator, wherein the set of rules is applied to:
i) the at least one operator, based on the operator type;
ii) the at least one buffer status; and
iii) the relationship that the at least one buffer has with the at least one operator; and
determining, by the computing processor, a performance bottleneck status associated with the parallel data processing environment, based on the operator bottleneck status.

2. The method of claim 1 wherein examining data flow associated with the parallel data processing environment comprises: determining the operator type associated with the at least one operator based on a data partition configuration associated with: i) the at least one buffer; and ii) the relationship that the at least one buffer has with the at least one operator.

3. The method of claim 1 wherein monitoring the at least one buffer to determine the buffer status associated with the at least one buffer comprises: determining the buffer status based on a flow of data from the at least one operator to at least one other operator.

4. The method of claim 3 wherein determining the buffer status based on the flow of data comprises: identifying the buffer status as at least one of: i) a buffer full status wherein no data can be written to the at least one buffer; ii) a buffer empty status wherein no data can be read from the at least one buffer; and iii) a buffer unknown status wherein the buffer status is neither the buffer full status nor the buffer empty status.

5. The method of claim 1 wherein applying the set of rules comprises: traversing the data flow associated with the parallel data processing environment to apply the rules to each operator in the data flow.

6. The method of claim 1 wherein determining the performance bottleneck status associated with the parallel data processing environment comprises: rendering a visualization of the data flow associated with the parallel data processing environment with respect to the operator bottleneck status associated with the at least one operator.

7. The method of claim 1 wherein determining the performance bottleneck status associated with the parallel data processing environment comprises: periodically monitoring the at least one buffer and applying the set of rules over a period of time to monitor performance of the parallel data processing environment.

8. A computer program product for identifying performance bottleneck status in a parallel data processing environment, the computer program product comprising:
a non-transitory computer readable storage medium having computer readable program code embodied therewith, the program code executable by a processor to:
examine data flow associated with the parallel data processing environment to identify:
i) at least one operator, wherein an operator type is associated with the at least one operator;
ii) at least one buffer; and
iii) a relationship that the at least one buffer has with the at least one operator, wherein the relationship is associated with the operator type; and wherein the computer readable program code configured to examine data flow associated with the parallel data processing environment is further configured to:
identify a first sub-operator connected to a second sub-operator, wherein no buffer exists between the first sub-operator and the second sub-operator; and
combine the first sub-operator and the second sub-operator to create the at least one operator;
monitor the at least one buffer to determine a buffer status associated with the at least one buffer;
apply a set of rules to identify an operator bottleneck status associated with the at least one operator, wherein the set of rules is applied to:
i) the at least one operator, based on the operator type;
ii) the at least one buffer status; and
iii) the relationship that the at least one buffer has with the at least one operator; and
determine a performance bottleneck status associated with the parallel data processing environment, based on the operator bottleneck status.

9. The computer program product of claim 8 wherein the computer readable program code configured to examine data flow associated with the parallel data processing environment is further configured to: determine the operator type associated with the at least one operator based on a data partition configuration associated with: i) the at least one buffer; and ii) the relationship that the at least one buffer has with the at least one operator.

10. The computer program product of claim 8 wherein the computer readable program code configured to monitor the at least one buffer to determine the buffer status associated with the at least one buffer is further configured to: determine the buffer status based on a flow of data from the at least one operator to at least one other operator.

11. The computer program product of claim 10 wherein the computer readable program code configured to determine the buffer status based on the flow of data is further configured to: identify the buffer status as at least one of: i) a buffer full status wherein no data can be written to the at least one buffer; ii) a buffer empty status wherein no data can be read from the at least one buffer; and iii) a buffer unknown status wherein the buffer status is neither the buffer full status nor the buffer empty status.

12. The computer program product of claim 8 wherein the computer readable program code configured to apply the set of rules is further configured to: traverse the data flow associated with the parallel data processing environment to apply the rules to each operator in the data flow.

13. The computer program product of claim 8 wherein the computer readable program code configured to determine the performance bottleneck status associated with the parallel data processing environment is further configured to: periodically monitor the at least one buffer and applying the set of rules over a period of time to monitor performance of the parallel data processing environment.

14. A system comprising:
a processor; and a computer readable storage medium operationally coupled to the processor, the computer readable storage medium having computer readable program code embodied therewith to be executed by the processor, the computer readable program code configured to:
examine data flow associated with the parallel data processing environment to identify:
  i) at least one operator, wherein an operator type is associated with the at least one operator;
  ii) at least one buffer; and
  iii) a relationship that the at least one buffer has with the at least one operator, wherein the relationship is associated with the operator type, and wherein the computer readable program code configured to examine data flow associated with the parallel data processing environment is further configured to: determine the operator type associated with the at least one operator based on a data partition configuration associated with:
    i) the at least one buffer; and
    ii) the relationship that the at least one buffer has with the at least one operator;
monitor the at least one buffer to determine a buffer status associated with the at least one buffer;
apply a set of rules to identify an operator bottleneck status associated with the at least one operator, wherein the set of rules is applied to:
  i) the at least one operator, based on the operator type;
  ii) the at least one buffer status; and
  iii) the relationship that the at least one buffer has with the at least one operator; and
determine a performance bottleneck status associated with the parallel data processing environment, based on the operator bottleneck status.

15. The system of claim 14 wherein the computer readable program code configured to monitor the at least one buffer to determine the buffer status associated with the at least one buffer is further configured to: determine the buffer status based on a flow of data from the at least one operator to at least one other operator.

16. The system of claim 14 wherein the computer readable program code configured to determine the buffer status based on the flow of data is further configured to: identify the buffer status as at least one of: i) a buffer full status wherein no data can be written to the at least one buffer; ii) a buffer empty status wherein no data can be read from the at least one buffer; and iii) a buffer unknown status wherein the buffer status is neither the buffer full status nor the buffer empty status.

17. The system of claim 14 wherein the computer readable program code configured to determine the performance bottleneck status associated with the parallel data processing environment is further configured to: periodically monitor the at least one buffer and applying the set of rules over a period of time to monitor performance of the parallel data processing environment.

* * * * *